Jan. 25, 1938.  L. G. WADE  2,106,445
DRYING DEVICE
Filed March 25, 1936
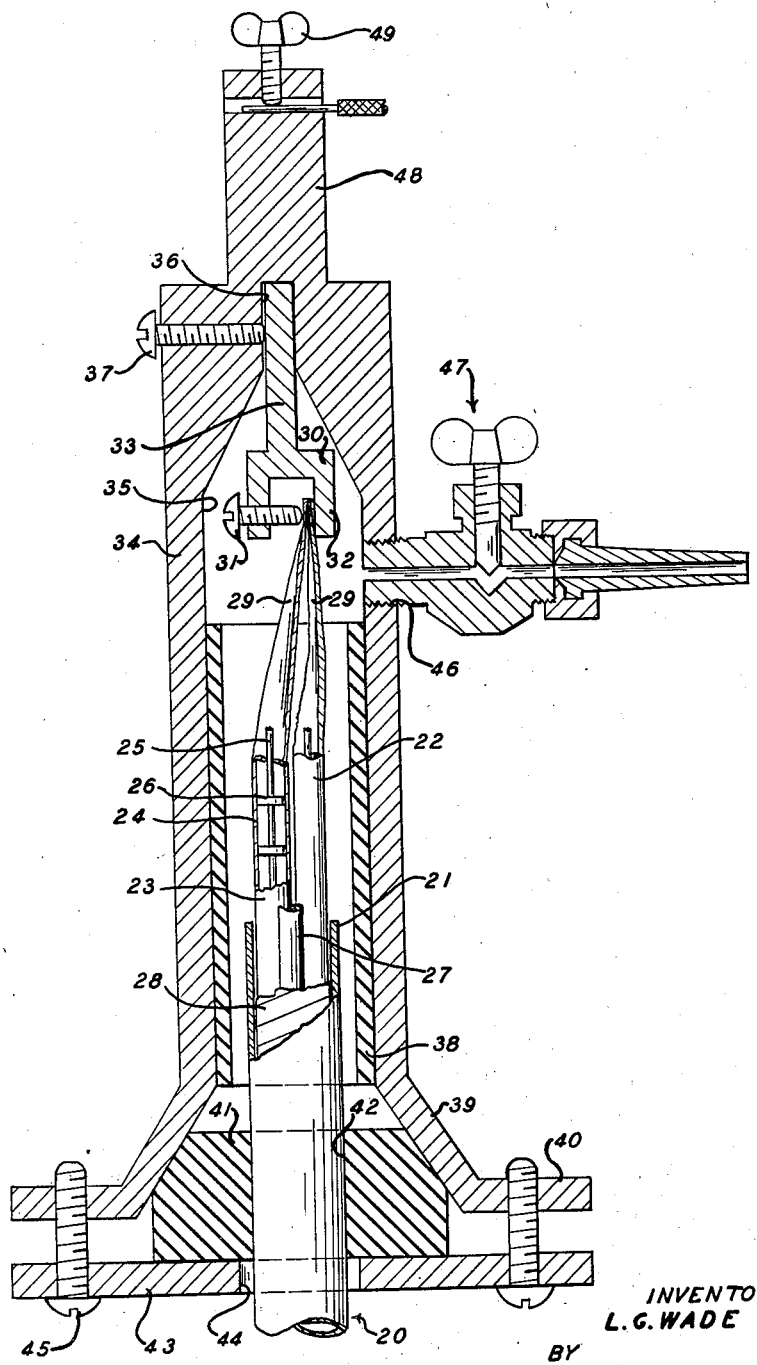
INVENTOR
L. G. WADE
BY
E. R. Nowlan
ATTORNEY Patented Jan. 25, 1938

2,106,445

UNITED STATES PATENT OFFICE 2,106,445

DRYING DEVICE

Lorentz G. Wade, Baltimore, Md., assignor to Western Electric Company, Incorporated, New York, N. Y., a corporation of New York Application March 25, 1936, Serial No. 70,781

6 Claims. (Cl. 34—30)

This invention relates to a drying device and more particularly to a device for use in drying electric cables.

In the manufacture of some kinds of electrical cables and especially those made with paired coaxial conductors, it may be important that the interior of the cable be rendered as moistureless as possible, and in some instances this may best be accomplished by simultaneously evacuating the interior of the cable and heating the conductors.

An object of the present invention is to provide a device for attachment to the end of a cable to enable and facilitate the simultaneous or alternative heating of the conductors by an electric current and transfer of fluid in the interior of the cable.

The invention, in one embodiment thereof, contemplates a device having a chambered body to be placed over an end of a cable adapted to be sealed to the cable, and to connect the conductors of the cable to an electric current for heating the conductors, and adapted to be connected to a vacuum or exhaust line.

Other objects and features of the invention will appear from the following detailed description of an embodiment thereof, taken in connection with the accompanying drawing in which the single figure is a longitudinal central section of a device constructed in accordance with the invention for attachment on an end of a cable.

In the embodiment of the invention herein disclosed, there is assumed to be a cable generally indicated at 20 and comprising an exterior sheath 21 of metal, as for example an extruded lead or lead alloy sheath. Or the sheath 21 may be a relatively thin tube of copper, brass, iron, or the like applied in any suitable manner and formed into a fluid tight sheath. Within this sheath are shown two pairs of coaxial conductors 22 and 23, each comprising an outer tubular conductor 24 and an inner conductor 25 coaxial therewith, the two conductors being spaced apart by split washers 26. Filler strands 27, which may be merely textile are used to round out the core comprising the two conductor pairs 22, 23 and two filler strands 27. These may be bound together by a wrapping 28 of paper tape over which the metal sheath 21 is extruded or formed.

It is desired to evacuate the space within the sheath 21 and at the same time to heat this space and its contents by passing an electric current through the conductors 24. To this purpose, each end of the cable is cut back as indicated in the drawing to leave the coaxial pairs 22 and 23 protruding beyond the fillers 27, 27 and the sheath 21. The outer conductors 24, 24 of the pairs are cut away into tapering ends 29, 29, protruding beyond the ends of the inner conductors 25, 25 as shown.

The ensuing operations will be described as at one end of the cable only, which is sufficient for some lengths of some kinds of cable, the other end being then merely sealed up in any convenient manner. In other lengths and other kinds of cables it may be preferable to exhaust from both ends at once, or to follow the evacuation with a sweeping out of the cable with warm, dry air or inert gas. In the latter case, a device will be applied as described below to each end of the cable.

The conductor ends 29, 29 are fastened into a contact clamp 30 having a recessed head 32 provided with a jam screw 31 to fasten the ends 29, 29 and having a stem 33. Now holding the end of the cable pointing vertically down for convenience, a metal body 34 having an axial cavity 35 extending from one end of the body through the greater part thereof, is drawn up over the end of the cable, the stem 33 dropping into a corresponding smaller bore 36 and being clamped in place by a screw 37.

The bore 35 is considerably wider than the external diameter of the sheath 21, and a tubular liner 38 of insulating material is held frictionally in the bore and prevents contact of the sheath 21 with the metal body 34. The body is everted around its opening first as a funnel shaped portion 39 and then as a collar 40, the body 34, funnel 39 and collar 40 being integral.

A plug 41 of compressible insulating material such as rubber has previously been placed on the sheath 21. This plug has a central bore 42 dimentioned to fit the outside of the sheath 21 snugly, and its periphery is formed in part to fit into the funnel 39. A metal closure plate 43 having a central aperture 44 considerably larger than the sheath 21 but also considerably smaller than the plug 41 has been placed on the cable ahead of the plug 41 and is now drawn up tight against the plug by screws 45 passing through suitable holes in the plate 43 and entering threaded bores in the collar 40. This seals the plug against both the sheath 21 and the funnel 39, thus sealing the end of the cable into the body. At the same time the sheath 21 is insulated from the body 34 and its appurtenances by the plug 41 and liner 38.

A bore 46 in the side wall of the body is threaded to receive any suitably constructed valve and nipple generally indicated by the numeral 47 which may be connected by any suitable means not shown to a vacuum pump or other evacuating device or to a supply of dry air or inert gas also not shown.

The body may further be formed with an extension 48 shaped as a binding post and provided with a screw 49 for connecting a lead from any suitable source of current not shown.

Assuming now that the length of cable to be treated is provided at each end with such a device. By connecting the two binding posts 48 to the two terminals of a suitable supply of electric current, the conductors 24 of the two coaxial units 22 and 23 will be heated throughout the length of the cable; and these will heat the other things within the sheath 21, both inside and outside of the conductors 24, by radiation, thus tending to vaporize any moisture occluded in or deposited upon any component of the cable within the sheath 21.

Then, if one of the two valves 47 be closed and if the other be connected to an exhausting means, such as a vacuum pump, the air and the vaporized water within the cable will be drawn out. This drying effect may be further enhanced, both as to rapidity and completeness by connecting the closed valve 47 to any suitable source of dry air or dry inert gas, e. g. nitrogen, carbon dioxide or the like, which will then be swept through the cable and will carry vestigial moisture along with it and out to the exhausting means.

All moisture, substantially, in the cable may thus be removed and the cable left filled with dry air or gas. If desired, also, oil may be pumped in through one of the valves 47 while the air or gas escapes through the other, to make a dry, oil filled cable. It is to be noted that the valve 47 is means to connect the interior of the body 21 to fluid transfer means if the latter be considered to mean exhaust means, dry air supply means, oil supply means, and the like.

In the case of a shorter length of cable, or if the last possible degree of drying is not requisite, one end of the cable may be sealed in any suitable way, and a device as disclosed be applied as described over the other end. By then connecting the binding post 48 and the other ends of the conductors 29 to the heating circuit, the conductors may be heated, while the cable is evacuated through the valve 47.

The embodiment of the invention herein disclosed is illustrative only and may be widely modified and departed from in many ways without departing from the spirit and scope of the invention as pointed out in and limited only by the appended claims.

What is claimed is:

1. A device for drying electric cables comprising a hollow conductive body, means to seal the body to the outer surface of a cable end inserted therein, means to connect the interior of the body to a fluid transfer means, means to connect a conductor of the cable electrically to the body, and means to connect the body electrically to a source of electric current.

2. A device for drying electric cables comprising a hollow metallic body to receive an end of an electric cable, insulating means to seal the body to the outer surface of the cable, means to connect a conductor of the cable to the body, and means to connect the body to a source of electric current.

3. A device for drying electric cables comprising a hollow metallic body to receive an end of an electric cable, insulating means to seal the body to the outer surface of the cable, a metallic member within the body and having means to grip an end of a conductor of the cable, means within the body to grip the member, and means to connect the body to a source of electric current.

4. A device for drying electric cables comprising a hollow metallic body to receive an end of an electric cable, insulating means to seal the body to the outer surface of the cable, a metallic member within the body and having means to grip an end of a conductor of the cable, means within the body to grip the member, means to connect the body to a source of electric current, and means to connect the interior of the body to a fluid transfer means.

5. A device for drying electric cables comprising a hollow metallic body to receive an end of an electric cable, an insulating lining within the body to insulate the cable from the body, insulating means to seal the body to the outer surface of the cable, a metallic member within the body and having means to grip an end of a conductor of the cable, means within the body to grip the member, and means to connect the body to a source of electric current.

6. A device for drying electric cables comprising a hollow metallic body to receive an end of an electric cable, an insulating lining within the body to insulate the cable from the body, insulating means to seal the body to the outer surface of the cable, a metallic member within the body and having means to grip an end of a conductor of the cable, means within the body to grip the member, means to connect the body to a source of electric current, and means to connect the interior of the body to a fluid transfer means.

LORENTZ G. WADE.